United States Patent [19]
Castner

[11] Patent Number: 5,919,876
[45] Date of Patent: Jul. 6, 1999

[54] SYNTHESIS OF CIS-1,4-POLYISOPRENE RUBBER

[75] Inventor: Kenneth Floyd Castner, Uniontown, Ohio

[73] Assignee: The Goodyear Tire & Rubber Company, Akron, Ohio

[21] Appl. No.: 09/167,600

[22] Filed: Oct. 7, 1998

Related U.S. Application Data

[63] Continuation of application No. 08/850,314, May 2, 1998, which is a continuation of application No. 08/663,803, Jun. 28, 1996, Pat. No. 5,652,304
[60] Provisional application No. 60/070,061, Dec. 30, 1997, provisional application No. 60/003,089, Aug. 31, 1995, and provisional application No. 60/005,781, Oct. 20, 1995.

[51] Int. Cl.⁶ .............................. C08F 4/649; C08F 2/06; C08F 136/08
[52] U.S. Cl. ...................... 526/141; 526/142; 526/340.2
[58] Field of Search .................................. 526/141, 142, 526/340.2

[56] References Cited

U.S. PATENT DOCUMENTS

| | | | |
|---|---|---|---|
| 3,047,559 | 7/1962 | Mayor et al. | 526/159 |
| 3,165,503 | 1/1965 | Kahn et al. | 526/340.2 X |
| 3,684,785 | 8/1972 | Hasegawa et al. | 526/340.2 X |
| 3,687,925 | 8/1972 | Fukui | 526/340.2 X |
| 3,864,278 | 2/1975 | LaHeij et al. | 526/340.2 X |

FOREIGN PATENT DOCUMENTS 1186490  1/1970  United Kingdom .

*Primary Examiner*—Fred Teskin
*Attorney, Agent, or Firm*—Alvin T. Rockhill

[57] ABSTRACT

The synthesis of cis-1,4-polyisoprene by polymerizing isoprene with a catalyst system which is comprised of a titanium tetrahalide, a trialkylaluminum compound and diphenylether is plagued with the formation of gel. This invention is based upon the unexpected discovery that gel formation can be reduced by conducting such polymerizations in the presence of a diarylamine, such as para-styrenated diphenylamine. The subject invention more specifically discloses a process for synthesizing cis-1,4-polyisoprene having a low gel content which comprises polymerizing isoprene in an inert organic solvent with a preformed catalyst system which is made by reacting an organoaluminum compound with titanium tetrahalide, such as titanium tetrachloride, in the presence of at least one ether, wherein said polymerization is conducted at a temperature which is within the range of about 0° C. to about 100° C., and wherein said polymerization is conducted in the presence of a diarylamine.

22 Claims, No Drawings

SYNTHESIS OF CIS-1,4-POLYISOPRENE RUBBER

This application claims the benefit of United States Provisional Application Ser. No. 60/070,061, filed Dec. 30, 1997, and is a continuation of U.S. patent application Ser. No. 08/850,314, filed on May 2, 1998 (now pending), which is a continuation of U.S. patent application Ser. No. 08/663,803, filed on Jun. 28, 1996 (now issued as U.S. Pat. No. 5,652,304), which claims the benefit of United States Provisional Application Ser. No. 60/003,089, filed Aug. 31, 1995, and United States Provisional Application Ser. No. 60/005,781, filed Oct. 20, 1995.

BACKGROUND OF THE INVENTION

Synthetic cis-1,4-polyisoprene possesses properties that are similar to natural rubber in many respects. It can accordingly be used beneficially in a wide variety of applications, such as in tires and in a wide variety of other rubber products. For instance, synthetic cis-1,4-polyisoprene is widely used in manufacturing rubber thread that is used in making elastic bands and in articles of clothing.

U.S. Pat. No. 3,386,983 discloses a process for producing polyisoprene having predominantly 1,2-cis-linkages which comprises solution polymerizing isoprene monomer in a hydrocarbon solvent selected from the group consisting of aliphatic, cycloaliphatic and aromatic hydrocarbons with an organometallic mixed catalyst composed of a trialkyl aluminum compound and titanium tetrachloride, wherein said polymerization is conducted in the presence of 0.05 to 100 moles of a polyhalogenated lower aliphatic or cycloaliphatic hydrocarbon per mole of titanium tetrachloride.

British Patent 1,186,490 discloses a process for the production of polyisoprene of predominantly 1,4-cis-structure, wherein isoprene is polymerized in the presence of a polymerization catalyst that is comprised of a trialkylaluminum compound, titanium tetrachloride and an ether of the general formula R—O—R in which R represents an alkyl radical containing from 3 to 6 carbon atoms, wherein the molar ratio of the trialkylaluminum compound to ether is within the range of 1:0.3 to 1:0.6 and wherein the molar ratio of the trialkylaluminum compound to titanium tetrachloride is within the range of 0.75:1 to 1.2:1.

Australian Patent 582,273 discloses a process for continuously producing a preformed catalyst system that is useful for catalyzing the polymerization of isoprene into polyisoprene. The process of Australian patent 582,273 involves mixing titanium tetrachloride with a mixture of a trialkyl aluminum compound and an ether in a first reaction zone to produce a catalyst slurry which is continuously withdrawn from the first reaction zone and added to a second reaction zone for aging to form the preformed catalyst.

The synthesis of cis-1,4-polyisoprene by polymerizing isoprene with a catalyst system which is comprised of a titanium tetrahalide, a trialkylaluminum compound and diphenylether is plagued with the formation of gel. In fact, cis-1,4-polyisoprene that is synthesized with such catalyst systems can contain 45 percent or more gel. In many applications, high levels of gel are undesirable or unacceptable.

SUMMARY OF THE IVVENTION

It has been unexpectedly found that diarylamine antioxidants, such as para-styrenated diphenylamine, do not interfere with the polymerization of isoprene into polyisoprene under solution polymerization conditions. The presence of diarylamines during such solution polymerizations of isoprene monomer into polyisoprene have also been unexpectedly found to reduce gel formation. Thus, diarylamines can be beneficially used to reduce the level of gelation in the solution polymerization of isoprene into polyisoprene. The diarylamine antioxidant can be premixed with the catalyst or it can be added to the reaction zone as a separate component.

The presence of diarylamine antioxidants during the polymerization proves to be highly beneficial because the polyisoprene rubber being synthesized is provided with improved stability during the high temperatures experienced during the finishing and storage of the solution polymerized rubber. The diarylamine antioxidant, of course, subsequently remains in the rubber and continues to provide it with stability against oxidative degradation throughout its service life.

It is generally undesirable for gelation to occur in the polymerization of isoprene into polyisoprene. In some applications, for instance, in manufacturing cis-1,4-polyisoprene rubber into thread, even relatively low amounts of gel cannot be tolerated. Thus, this invention proves to be particularly valuable for utilization in synthesizing cis-1,4-polyisoprene rubber that will be used in making thread for use in making elastic bands and in articles of clothing.

The present invention more specifically discloses a process for synthesizing cis-1,4-polyisoprene having a low gel content which comprises polymerizing isoprene in an inert organic solvent with a preformed catalyst system which is made by reacting an organoaluminum compound with a titanium tetrahalide, preferably titanium tetrachloride, in the presence of at least one ether, wherein said polymerization is conducted at a temperature which is within the range of about 0° C. to about 100° C., and wherein said polymerization is conducted in the presence of a diarylamine.

The present invention further discloses a method for the solution polymerization of isoprene into cis-1,4-polyisoprene in a process comprising the steps of:

(1) charging into a reaction zone said isoprene and a preformed catalyst system which is made by reacting an organoaluminum compound with a titanium tetrahalide;

(2) allowing said isoprene to polymerize into cis-1,4-polyisoprene at a temperature within the range of about 0° C. to about 100° C. in the presence of a diarylamine; and (3) withdrawing said cis-1,4-polyisoprene from said reaction zone.

DEATILED DESCRIPTION OF THE INVENTION

Isoprene monomer can be polymerized utilizing the technique of this invention into cis-1,4-polyisoprene (95 percent or more cis-1,4-isomeric isoprene units) in a continuous solution polymerization process with a preformed titanium catalyst system. The cis-1,4-polyisoprene made by the process of this invention will normally have a number average molecular weight of at least 100,000 and will more typically have a number average molecular weight which is greater than 200,000.

The polymerizations of this invention are carried out as solution polymerizations in a hydrocarbon solvent which can be one or more aromatic, paraffinic or cycloparaffinic compounds. These solvents will normally contain from 4 to about 10 carbon atoms per molecule and will be liquids under the conditions of the polymerization. Some representative examples of suitable organic solvents include isooctane, cyclohexane, normal hexane, benzene, toluene, xylene, ethylbenzene, and the like, alone or in admixture.

In the solution polymerizations of this invention, there will normally be from about 5 to about 35 weight percent isoprene monomer in the polymerization medium. Such polymerization media are, of course, comprised of the organic solvent and the isoprene monomer. As the polymerization proceeds, isoprene monomer is converted to polyisoprene and accordingly the polymerization medium will contain from about 5 weight percent to about 35 weight percent unreacted isoprene monomer, oligomers of isoprene and polyisoprene rubber. In most cases, it will be preferred for the polymerization medium to contain from about 10 to about 30 weight percent monomer, oligomer and polymer. It is generally more preferred for the polymerization medium to contain from 20 to 25 weight percent monomer, oligomer and polymer.

Polymerization is typically initiated by adding the preformed titanium catalyst system and the diphenylamine antioxidant to the polymerization medium. In batch techniques, it is normally convenient to add the catalyst components and the diphenylamine to a polymerization medium which already contains isoprene monomer in an organic solvent.

The solution polymerization of isoprene will be conducted at a temperature which is within the range of about 0° C. to about 100° C. In such solution polymerizations, the temperature in the reaction zone will normally be maintained within the range of about 35° C. to about 70° C. It is preferred to utilize a temperature in the reaction zone which is within the range of about 40° C. to about 60° C. The most preferred temperature for carrying out the polymerization of isoprene into high cis-1,4-polyisoprene is about 45° C. to about 50° C.

The preformed titanium catalyst system is prepared by reacting titanium tetrahalide with an organoaluminum compound. The titanium tetrahalide is normally titanium tetrafluoride, titanium tetrachloride or titanium tetrabromide with titanium tetrachloride being preferred. The organoaluminum compound is preferably complexed with an ether.

The organoaluminum compound that can be utilized has the structural formula:

in which $R_1$ is selected from the group consisting of alkyl groups (including cycloalkyl), aryl groups, alkaryl groups, arylalkyl groups and hydrogen; $R_2$ and $R_3$ being selected from the group consisting of alkyl groups (including cycloalkyl), aryl groups, alkaryl groups and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H).

The titanium catalyst system utilized will normally be preformed. Such preformed titanium catalyst systems maintain a high level of activity over a long period of time. The utilization of such a preformed catalyst system also results in the formation of uniform polymeric product. Such preformed titanium catalyst systems are prepared in the presence of one or more ethers.

The preformed titanium catalyst can be made by a batch process. In such a batch process, the catalyst components are added sequentially to a reaction vessel. The titanium tetrahalide component is generally added to the reaction vessel first in the form of an organic solution. The aluminum component and the ether are then added to the reaction vessel to create the preformed titanium catalyst which is in the form of a slurry. The preformed titanium catalyst system can also be made by a continuous process as described in Australian Patent 582,273. The teachings of Australian Patent 582,273 are incorporated herein by reference.

In preparing the preformed catalyst system, the titanium tetrachloride and a mixture of the aluminum compound and an ether are mixed together. The titanium tetrachloride can be added as a solution of titanium tetrachloride in an inert organic solvent or it can be added neat (without being diluted in an inert organic solvent).

The term "an inert organic solvent" as used herein refers to an organic solvent which is chemically inert to all of the catalyst components utilized in the process. In other words, the inert organic solvent will not react with the titanium tetrachloride, the trialkylaluminum compound or the ether compound. Some representative examples of inert organic solvents include aromatic hydrocarbons, aliphatic hydrocarbons, alicyclic hydrocarbons and mixtures of two or more of the above-mentioned solvents. Suitable aromatic hydrocarbons for use as the inert organic solvent include benzene, toluene, xylenes, ethylbenzene, diethylbenzene, isobutylbenzene and the like. Some representative examples of suitable aliphatic hydrocarbons include n-pentane, n-hexane, isohexanes, n-heptane, n-octane, isooctanes, n-decane, 2,2-dimethylbutane, petroleum ether, kerosene, petroleum spirits, petroleum naphtha and the like. Cyclohexane and methylcyclohexane are representative of alicyclic hydrocarbons that can be utilized as the inert organic solvent.

Titanium catalysts are extremely sensitive to contaminants such as oxygen, oxygen containing compounds and sulfur containing compounds and very small quantities of such contaminants can impair the activity of the catalyst. Because of this sensitivity, contaminants such as water, alcohols, aldehydes, oxides of carbon, carbonyl compounds, hydrogen sulfide, mercaptans and the like should not be present in the inert organic solvent in significant quantities. Oxygen, which is dissolved in the inert organic solvent, should be removed before the preparation of the solution of titanium tetrachloride or the solution of the trialkylaluminum compound and the ether. This can be accomplished by sparging the inert organic solvent with a noble gas or nitrogen.

The ethers that are used in the present invention generally contain from 2 to 40 carbon atoms and preferably contain from 4 to 20 carbon atoms. Some representative examples of such ethers include diethyl ether, dipropyl ether, diphenyl ether, methyl phenyl ether and the like. Diethyl ether is a good choice for use in conjunction with triethylaluminum and diphenyl ether is a good choice for use in conjunction with triisobutyl aluminum.

The titanium tetrahalide can be utilized as a solution or neat. Solutions of titanium tetrahalides can be prepared by simply mixing the titanium tetrahalide into an inert organic solvent so as to produce a homogeneous solution containing at least 3 weight percent titanium tetrahalide. In most cases, such solutions of titanium tetrahalide will contain from 3 to 25 weight percent titanium tetrahalide, based upon the total weight of the solution. The mixture of the trialkylaluminum compound and the ether can be utilized as a solution or neat. The ratio of the ether to the trialkylaluminum compound will generally be from 0.4:1.0 to 1.2:1.0 with a ratio of 0.5:1.0 to 1.0:1.0 being preferred. Such solutions of the trialkylaluminum compound and the ether can be prepared by mixing from at least 3 weight percent of the trialkylaluminum compound and at least 1.5 weight percent of the ether into an inert organic solvent so as to produce a homogeneous solution. In most cases, the mixture of the trialkylaluminum compound and the ether will contain from 3 to 25 weight percent of the trialkylaluminum compound and from 1.5 to 13 weight percent of the ether. Both of these components can be added neat if a sufficient amount of an inert organic solvent is separately added to produce a solution containing 1 to 13 weight percent titanium tetrahalide, 1 to 13 weight percent trialkylaluminum compound and 0.7 to 8 weight percent of the ether.

The titanium tetrahalide and the mixture of the trialkylaluminum compound and the ether are added in amounts so that the mole ratio of the trialkylaluminum compound to titanium tetrahalide is between about 0.7:1.0 to 1.2:1.0. Preferably, the mole ratio of the trialkylaluminum compound to titanium tetrahalide will be between 0.8:1 and 1.1:1 with the most preferred mole ratio of the trialkylaluminum compound to titanium tetrahalide being between 0.85:1.0 and 0.95:1.0. The titanium tetrahalide and the solution of the trialkylaluminum compound and the ether are thoroughly mixed by applying some form of vigorous agitation. Normally, the agitation will be provided by rotating blades in the reaction zone.

The catalyst components are mixed and maintained at a temperature of from −20° C. to 60° C. It is generally preferred for the catalyst system to be preformed at a temperature of from −5° C. to 50° C.

The catalyst slurry formed is allowed to age for from 0.5 hours to 200 hours to form a preformed catalyst composition. It is normally preferred to age the preformed catalyst system for about 1 hour to about 24 hours. It is most preferred to age the catalyst system for 2 hours to 6 hours.

To reduce the level of gel formation, the solution polymerizations of this invention are conducted in the presence of a diarylamine, such as para-styrenated diphenylamine. A stream of the diarylamine which is dissolved in a hydrocarbon solvent is typically fed into the polymerization medium as a rate that is sufficient to maintain the desired ratio of diarylamine to titanium tetrahalide. Generally, the molar ratio of the diarylamine to titanium tetrahalide will be within the range of about 0.01:1 to about 5:1. The molar ratio of the diarylamine to titanium tetrahalide will more typically be within the range of about 0.05:1 to about 1:1. The molar ratio of the diarylamine to titanium tetrahalide will preferably be within the range of about 0.1:1 to about 0.5:1 and will most preferably be within the range of about 0.15:1 to 0.3:1.

The diarylamines which can be utilized have the general structural formula:

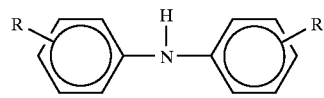

wherein R represents a hydrogen atom, an aryl group, an alkyl group or an alkaryl group. Para-styrenated diphenylamines are highly preferred diarylamines. wingstay®29 para-styrenated diphenylamine is sold commercially by The Goodyear Tire & Rubber Company and typically consists of several isomers including:

p,p'-distyryl diphenylamine
o,p,p'-tristyryl diphenylamine
o,p'-distyryl diphenylamine
p-styryl diphenylamine
o,o'-distyryl diphenylamine Para-styrenated diphenylamine, which is also known as p,p'-distyryl diphenylamine has the chemical structural formula:

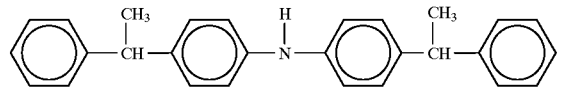

Para-styrenated diphenylamine is also sold by Lowi under the tradename Lowinox SDA and by Mobay under the tradename Vulkanox DDA.

After the polymerization is completed, the cis-1,4-polyisoprene rubber may be recovered from the resulting polymer solution (rubber cement) by any of several procedures. One such procedure comprises mixing the rubber cement with a polar coagulating agent, such as methanol, ethanol, isopropylalcohol, acetone, or the like. The coagulating agent can be added at room temperature or below whereupon the liquified low molecular weight hydrocarbons will vaporize. If desired, gentle heat may be applied to hasten the removal of low molecular weight hydrocarbons, but not sufficient heat to vaporize the polar coagulating agent. The vaporized low molecular weight hydrocarbon solvents can then be recovered and recycled. The coagulated polyisoprene rubber is recovered from the slurry of the polar coagulating agent by centrifugation, decantation or filtration.

Another procedure for recovering the cis-1,4-polyisoprene rubber is by subjecting the rubber solution to spray-drying. Such a procedure is particularly suitable for continuous operations and has the advantage that heat requirements are at a minimum. When such a procedure is used, the recovered polymer should be washed soon after recovery with a polar solvent in order to destroy the remaining active catalyst contained in the polymer. In such procedures, the vaporized organic solvents are also easily recovered but will normally require purification before being recycled.

In commercial operations, steam stripping techniques will typically be empolyed to recover the cis-1,4-polyisoprene rubber from the polymer cement. In such steam stripping procedures solvent and residual monomer will typically be recycled. After steam stripping, the cis-1,4-polyisoprene rubber crumb will normally be dried in an extruder-drier at an elevated temperature.

This invention is illustrated by the following examples which is merely for the purpose of illustration and are not to be regarded as limiting the scope of the invention or the manner in which it can be practiced. Unless specifically indicated otherwise, parts and percentages are given by weight.

EXAMPLE 1-11

In this experiment, isoprene was polymerized in 4-ounce (118 ml) polymerization bottles utilizing preformed titanium tetrachloride/triisobutylaluminum/diphenylether catalyst systems. The polymerizations were carried out at a temperature of 35° C. in the presence of various amounts of Wingstay®29 para-styrenated diphenylamine. The titanium tetrachloride was present at a level of 0.3 phm. The amount of para-styrenated diphenylamine utilized in each of the polymerizations, the polymer yield and the level of gel is reported in Table I.

TABLE I

| Example | Diarylamine/Ti Ratio | Yield | Gel[1] |
|---------|---------------------|-------|--------|
| 1       | —                   | 97%   | 38%    |
| 2       | 0.012               | 79%   | 27%    |
| 3       | 0.024               | 81%   | 22%    |
| 4       | 0.036               | 75%   | 24%    |
| 5       | 0.047               | 77%   | 19%    |
| 6       | 0.059               | 80%   | 17%    |
| 7       | 0.071               | 83%   | 17%    |
| 8       | 0.095               | 96%   | 9%     |
| 9       | 0.142               | 94%   | 8%     |
| 10      | 0.189               | 93%   | 7%     |
| 11      | 0.236               | 95%   | 1%     |

[1]Gel was determined by centrifuging 0.25 percent polymer solutions in toluene at 2000 rpm for 10 minutes and then determining the concentration of the soluble fraction.

This series of experiments shows that the level of gel could be reduced by conducting the polymerization of isoprene in the presence of para-styrenated diphenylamine. As can be seen from Table I, the level of gel was reduced with increasing levels of the para-styrenated diphenylamine. By utilizing the process of this invention, gel can be greatly reduced, thus reducing the need for filtration and special reactor cleaning. Also, reactor residence time can be reduced which yields higher reactor productivity.

Variations in the present invention are possible in light of the description provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for synthesizing cis-1,4-polyisoprene having a low gel content which comprises polymerizing isoprene in an inert organic solvent with a preformed catalyst system which is made by reacting an organoaluminum compound with a titanium tetrahalide in the presence of at least one ether, wherein said polymerization is conducted at a temperature which is within the range of about 0° C. to about 100° C., and wherein said polymerization is conducted in the presence of para-styrenated diphenylamine.

2. A process as specified in claim 1 wherein the titanium tetrahalide is titanium tetrachloride.

3. A process as specified in claim 2 wherein the molar ratio of the para-styrenated diphenylamine to the titanium tetrachloride is within the range of about 0.01:1 to 5:1.

4. A process as specified in claim 2 wherein the molar ratio of the para-styrenated diphenylamine to the titanium tetrachloride is within the range of about 0.05:1 to 1:1.

5. A process as specified in claim 2 wherein the molar ratio of the para-gyrenated dighenylamine to the titanium tetrachloride is within the range of about 0. 1:1 to 0.5:1.

6. A process for synthesizing cis-1,4-polyisoprene having a low gel content which comprises polymerizing isoprene in an inert organic solvent with a preformed catalyst system which is made by reacting an organoaluminum compound with titanium tetrachloride in the presence of at least one ether, wherein said polymerization is conducted at a temperature which is within the range of about 0° C. to about 100° C., wherein said polymerization is conducted in the presence of para-styrenated diphenylamine and wherein the molar ratio of the para-styrenated diphenylamine to the titanium tetrachloride is within the range of about 0.1:1 to 0.5:1.

7. A process as specified in claim 6 wherein the molar ratio of the para-styrenated diphenylamine to the titanium tetrachloride is within the range of about 0.15:1 to 0.3:1.

8. A process as specified in claim 7 wherein the preformed catalyst system is made by reacting the organoaluminum compound with the titanium tetrahalide in the presence of at least one ether.

9. A method for the solution polymerization of isoprene into cis-1,4-polyisoprene in a process comprising the steps of:

(1) charging into a reaction zone said isoprene and a preformed catalyst system which is made by reacting an organoaluminum compound with titanium tetrahalide;

(2) allowing said isoprene to polymerize into cis-1,4-polyisoprene at a temperature within the range of about 0° C. to about 100° C. in the presence of para-styrenated diphenylamine and in the presence of an inert organic solvent; and (3) withdrawing said cis-1,4-polyisoprene from said reaction zone.

10. A method as specified in claim 9 wherein the ratio of the para-styrenated diphenylamine to the titanium tetrahalide is within the range of about 0.01:1 to about 5:1; and wherein the preformed catalyst system is made by reacting the organoaluminum compound with the titanium tetrahalide in the presence of at least one ether.

11. A method as specified in claim 3 wherein said organoaluminum compound has the structural formula

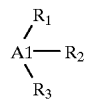

wherein $R_1$ is selected from the group consisting of alkyl groups, aryl groups, alkaryl groups, arylalkyl groups and hydrogen; and wherein $R_2$ and $R_3$ can be the same or different and are selected from the group consisting of alkyl groups, aryl groups, alkaryl groups and arylalkyl groups.

12. A method as specified in claim 3 wherein said ether contains from about 4 to about 20 carbon atoms; wherein said titanium tetrahalide is titanium tetrachloride; and wherein said polymerization is conducted at a temperature which is within the range of about 35° C. to about 70° C.

13. A method for synthesizing cis-1,4-polyisoprene having a low gel content which comprises polymerizing isoprene in an inert organic solvent with a preformed catalyst system which is made by reacting an organoaluminum compound with a titanium tetrachloride in the presence of at least one ether wherein said polymerization is conducted at a temperature which is within the range of about 35° C. to about 70° C. wherein said ether contains from about 4 to about 20 carbon atoms, wherein said polymerization is conducted in the presence of para-styrenated diphenylamine, and wherein the molar ratio of the para-styrenated diphenylamine to the titanium tetrachloride is within the range of about 0.01:1 to about 5:1.

14. A method as specified in claim 13 wherein the molar ratio of the para-styrenated diphenylamine to the titanium tetrachloride is within the range of about 0.05:1 to 1:1.

15. A method as specified in claim 13 wherein the molar ratio of the para-styrenated diphenylamine to the titanium tetrachloride is within the range of about 0.1:1 to 0.5:1.

16. A method as specified in claim 13 is wherein the molar ratio of the para-styrenated diphenylamine to the titanium tetrachloride is within the range of about 0.15:1 to 0.3:1.

17. A method as specified in claim 4 wherein said polymerization is conducted at a temperature within the range of 40° C. to 60° C.

18. A method as specified in claim 17 wherein the molar ratio of the organoaluminum compound to the titanium tetrachloride is within the range of about 0.7:1 to about 1.2:1.

19. A method as specified in claim 18 wherein the molar ratio of the ether to the organoaluminum compound is within the range of about 0.4:1 to about 1.2:1, and wherein the molar ratio of the organoaluminum compound to the titanium tetrachloride is within the range of about 0.7:1 to about 1.2:1.

20. A method as specified in claim 18 wherein the molar ratio of the ether to the organoaluminum compound is within the range of about 0.5:1 to about 1:1 and wherein the molar ratio of the organoaluminum compound to the titanium tetrachloride is within the range of about 0.8:1 to about 1.1:1.

21. A method as specified in claim 10 wherein the molar ratio of the ether to the organoaluminum compound is within the range of about 0.4:1 to about 1.2:1, wherein the molar ratio of the organoaluminum compound to the titanium tetrachloride is within the range of about 0.7:1 to about 1.2:1, and wherein the molar ratio of the para-styrenated diphenylamine to the titanium tetrachloride is within the range of about 0.1:1 to 0.5:1.

22. A method as specified in claim 21 wherein said polymerization is conducted at a temperature which is within the range of about 35° C. to about 70° C., and wherein the molar ratio of the para-styrenated diphenylamine to the titanium tetrachloride is within the range of about 0.15:1 to 0.3:1.

* * * * *